United States Patent
Hummel et al.

(10) Patent No.: US 8,635,385 B2
(45) Date of Patent: Jan. 21, 2014

(54) MECHANISM TO HANDLE PERIPHERAL PAGE FAULTS

(75) Inventors: Mark D. Hummel, Franklin, MA (US); Andrew G. Kegel, Redmond, WA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 774 days.

(21) Appl. No.: 12/838,176

(22) Filed: Jul. 16, 2010

(65) Prior Publication Data

US 2012/0017063 A1    Jan. 19, 2012

(51) Int. Cl.
*G06F 13/00*    (2006.01)

(52) U.S. Cl.
USPC .......................................................... 710/33

(58) Field of Classification Search
USPC .......................................................... 710/33
See application file for complete search history.

(56) References Cited

U.S. PATENT DOCUMENTS

| | | | |
|---|---|---|---|
| 5,903,901 A * | 5/1999 | Kawakura et al. | 715/207 |
| 7,613,898 B2 | 11/2009 | Haertel et al. | |
| 7,623,134 B1 | 11/2009 | Danilak | |
| 2008/0209130 A1 | 8/2008 | Kegel et al. | |
| 2010/0082872 A1 | 4/2010 | Fleming | |
| 2012/0117298 A1 * | 5/2012 | Scannell et al. | 711/6 |

OTHER PUBLICATIONS

"AMD I/O Virtualization Technology (IOMMU) Specification License Agreement," Advanced Micro Devices, Inc. IOMMU Architectural Specification, PID 34434 Rev. 1.26, Feb. 2009, 90 pages.
PCI Express, Address Translation Services, Rev. 1.1, Jan. 26, 2009, 54 pages.
International Search Report and Written Opinion, mailed Oct. 20, 2011 in PCT/US2011/044149, 10 pages.

* cited by examiner

*Primary Examiner* — Chun-Kuan Lee
(74) *Attorney, Agent, or Firm* — Abel Law Group, LLP

(57) ABSTRACT

A page service request is received from a peripheral device requesting that a memory page be loaded into system memory. Page service request information corresponding to the received page service request is written as a queue entry into a queue structure in system memory. The processor is notified that the page request is present in the queue. The processor may be notified with an interrupt of a new queue entry. The processor processes the page service request and the peripheral device is notified of the completion of the processing of the request.

21 Claims, 3 Drawing Sheets

| First event code dependent operand [31:0] | +00 |
|---|---|
| PPRCode[3:0]　　First event code dependent operand [59:32] | +04 |
| Second event code dependent operand [31:0] | +08 |
| Second event code dependent operand [63:32] | +12 |

| 31　　28 27　　25 24 23 22 21 20 19 18 17 16 15　　12 11 10 9 8　　2 1 0 | |
|---|---|
| PASID[15:0]　　　　　　　　DeviceID[15:0] | 00 |
| 0001b　Reserved　GN RZ Resv WP Resv RP NX　Reserved　　PPRtag | 04 |
| ADDRESS [31:12]　　S　　COUNT | 08 |
| ADDRESS [63:32] | 12 |

MECHANISM TO HANDLE PERIPHERAL PAGE FAULTS

BACKGROUND

1. Field of the Invention

The invention relates to page requests within computer systems and more particularly to those systems handling page requests from peripheral devices.

2. Description of the Related Art

As peripheral devices develop more capabilities, one such capability being incorporated into peripheral devices is a translation look aside buffer (TLB) that indicates to the peripheral whether a logical address that the peripheral device wants to access is available in system memory. Such a page request, previously provided by the memory controllers, can now be sent by peripheral devices having TLBs. There needs to be a way to handle such page requests in a flexible and fair manner.

SUMMARY OF EMBODIMENTS OF THE INVENTION

In an embodiment, a method is provided that includes receiving a page request from a peripheral device requesting that a memory page be loaded into system memory. The page request information that corresponds to the received page request is written as a queue entry into a queue structure. The processor is notified that the page request is present in the queue. In an embodiment, the processor may be notified with an interrupt that is uniquely associated with existence of a new page request.

In an embodiment, a computer system is provided that includes an integrated circuit having a first communication link interface to receive a page request from a peripheral device indicating a need for memory page services. Queue entry generation logic responds to receipt of the page request by generating a queue entry incorporating information from the page request, sends the queue entry over a second communication interface to write the queue entry into a page request queue in system memory and notifies the processor of the queue entry.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
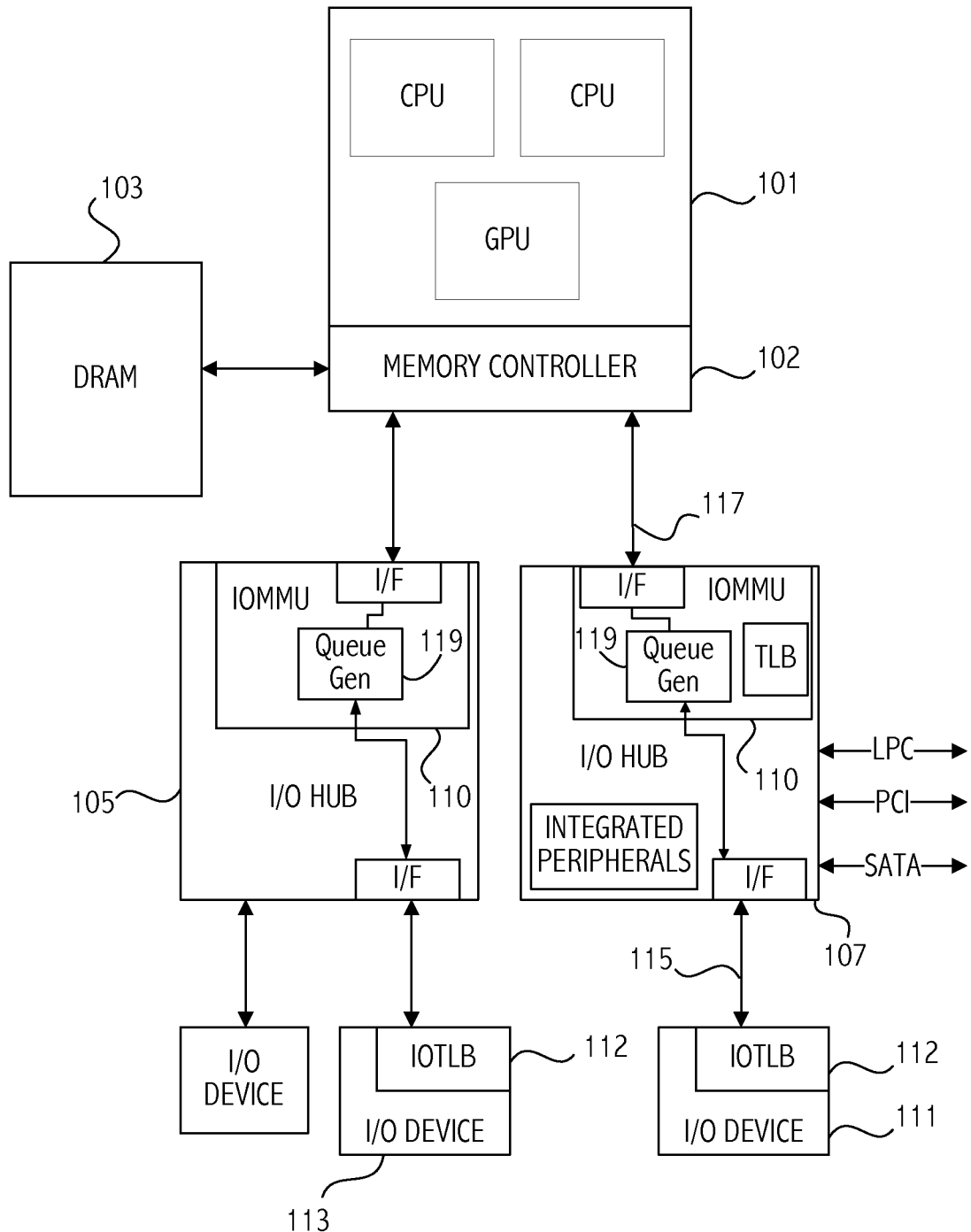
FIG. 1 illustrates an exemplary system according to an embodiment of the invention.

A page request indicates to the system that a new page needs to be loaded into memory. FIG. 1 illustrates a system according to an embodiment of the invention that handles page service requests from peripheral devices. The exemplary system includes a processor 101 including one or more central processing units (CPUs) and a graphics processing unit (GPU), system memory 103, I/O Hubs 105 and 107, peripheral devices 111 and 113. The I/O Hubs perform traditional chip set functions in the computer architecture (referred to in previous architectures as a South-Bridge), which includes interfacing with various I/O devices with a variety of I/O interfaces. In the embodiment shown in FIG. 1, the I/O Hubs 105 and 107 incorporates an I/O Memory Management Unit (IOMMU) 110 that provides support for mapping the I/O addresses to the appropriate physical addresses in system memory and other memory management functions. In alternative embodiments, the processor (illustrated in the exemplary embodiment including CPUs and a GPU) may be embodied in other processors such as digital signal processors, microcontrollers and the like. The computer system of FIG. 1 may be embodied in handheld devices, PDAs, notebooks, desktop computers, tablets, servers, or any other system having a processor and peripheral devices having memory requirements in accordance with the teachings herein. Additionally, I/O Hubs 105, 107 may be incorporated into processor 101.

Peripheral devices 111 and 113 include an I/O TLB 112 and thus can determine when a virtual address is available in system memory 103. When the peripheral device 111 determines that the address is not available in system memory, the peripheral device issues a page request over communication link 115 to I/O Hub 107, which is received by IOMMU 110. In order to service that request, IOMMU 110 has to communicate over communication link 117. In systems where communication links 115 and 117 operate according to different communication protocols, when the peripheral device 111 issues a page request, that page request must be translated to the appropriate protocol.

For example, communication link 115 may be operated in accordance with the PCIe™ protocols, and communication link 117 may be operated in accordance with another set of communication protocols such as HyperTransport™ protocols. In order to properly respond to the page request, the page request needs to be converted into a form that can be properly processed by processor 101.

In one embodiment, the protocols for communication link 115 are converted from PCIe™ semantics to semantics that are compatible with HyperTransport™ or AMD64™ in order to be processed by the system. In other embodiments, other processor architectures and other communication link protocols may be involved.

The page request transaction is a transient operation on the communication link 115. In one embodiment, the page request is supplied on communication link 115 in accordance with the Page Request Interface (PRI) protocol defined for PCIe (one of the PCI family of communication interfaces). Because the page request is transient (the PRI is a posted operation), the information needs to be captured and delivered to the processor. In addition, some of that information is included in the PRI response to the peripheral. Other page requests may come from other peripherals to be serviced by the processor while the initial request is being serviced, so some sort of buffering is required so that the PRI information is preserved while the overall system continues to operate.

One solution is to create new hardware with a set of registers to be accessed through MMIO (memory-mapped I/O) operations. The new hardware on the PCIe bus would accept the PRI request, store the received information (request) in the set of registers, and then notify the processor using an interrupt. The system software running on the processor would accept the interrupt, read the registers, process the request, and write some additional registers (or perhaps the same registers). A special write operation would cause the new hardware to package the contents of the registers into a PCIe bus transaction to signal the peripheral that the PRI service is completed. There are many places that one could locate this new hardware. The IOMMU is a logical place (i.e., the IOMMU already provides I/O-related services and so it is reasonable to consolidate the new PRI function with an existing IOMMU function). This solution is simple to implement in hardware, but has the disadvantage that all peripherals in a PCIe segment would be serialized behind a set of registers. One could have a set of registers to hold multiple PRI requests, using a "valid" bit that hardware would set and software would clear, but this consumes significant hardware resources and is complex to manage in software.

In an embodiment, communication link 117 is a HyperTransport link. Rather than add the set of registers described above, another solution would be to add semantics to the communication, e.g., HyperTransport, protocol, and processor architectures that would convert the PRI packet into a HyperTransport transaction to be consumed by the processor. That would need to be added to all processors and suffers the same problems as the new hardware contemplated above, such as consumption of hardware resources, serialization behind a set of registers, and complex software management. Finally, this would be very hard to implement in other than a single-deep serialized fashion.

Figures 2, 3, 4:
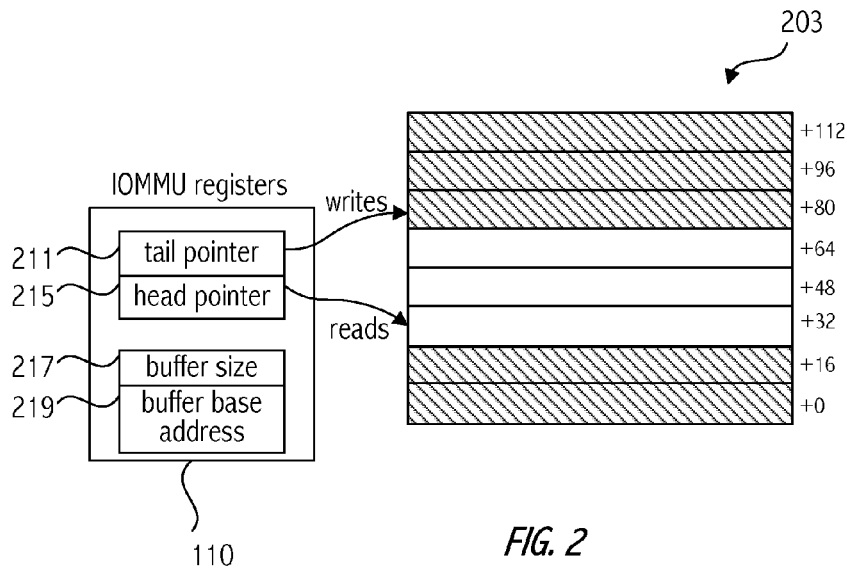
FIG. 2 illustrates an exemplary queue structure according to an embodiment of the invention.
FIG. 3 illustrates an exemplary queue entry.
FIG. 4 illustrates an exemplary page request as received from a peripheral device according to an embodiment of the invention.

In an embodiment of the invention, I/O Hub 107 receives the page service request (PRI or other protocol utilized on the interface), assembles the information into a standard format, and writes the information to a queue in system memory 103. FIG. 2 illustrates an exemplary queue structure 203 in system memory 103. Utilization of a queue provides flexible capacity and allows multiple requests to be handled at the same time without losing any requests. Because the queue is in system memory, the queue can be arbitrarily large (or small), and the size can be set by system software based on system activity or other considerations. The scalability of the solution is no longer limited simply by hardware resources and can grow as large as needed. In an embodiment, the hardware functionality 119 to generate the queue entry from the received page request is integrated into an IOMMU (see FIG. 1). In one embodiment, the page service request can be integrated into a queue that provides other functionality besides page service requests, such as event reporting. An event may be, e.g., an error condition detected by the IOMMU. In one embodiment, the page service requests are handled as a type of event and merged directly into an event log (or queue) with other events.

In another embodiment, the page service requests have a unique page service request queue. In the case of a distinct page service request queue (the Peripheral Page Request (PPR) queue or log), an interrupt may be used to inform the processor that a new PPR service request has arrived. The interrupt can be different from an event interrupt, and unique to the PPR queue status, thus allowing the PPR handling code to be invoked directly (without the overhead of general event processing). Also, the code that handles PPR requests can be isolated from the event log handling, thereby providing better system security through functional isolation. The queue has head and tail pointers for simple management. In other embodiments, rather than an interrupt, a message may be used to tell the processor of the existence of a new queue entry.

Referring to FIG. 2, the IOMMU contains registers that include a tail pointer register 211, a head pointer register 215, a buffer size register 217 and a buffer base address register 219. In an embodiment, the PPR log or queue occupies contiguous physical memory starting at the programmable base address in base address register 219 up to the programmable size specified in buffer size register 217. When the host software consumes a queue entry, it increments the read pointer to indicate to the IOMMU that the processor has consumed a queue entry. When the IOMMU sends over a new queue entry, the IOMMU increments the tail pointer. The queue is full when all but one queue slot is used and overflows when no slots are available. When an overflow exists, the host software must either consume queue entries or enlarge the queue to avoid disabling entering page requests in the page request queue.

An exemplary generic queue entry is shown in FIG. 3. The entry includes a PPRCode identifying the entry as a PPR queue entry. The queue entry is sent over the communications interface 117 to the memory controller 102, which writes the queue entry into the system memory 103 (see FIG. 1).

FIG. 4 illustrates an embodiment of a PPR queue entry generated from a received peripheral page service request received in a PRI packet. The Process Address Space ID (PASID) is a field to identify the user process within a guest VM (if virtualization is active). If virtualization is not present, the PASID identifies a user process in a native OS. The DeviceID identifies the requesting peripheral. The PPR code 0001b is a value is used to define this particular format; however, other formats are possible that would contain different information or another format. The GN bit indicates whether the PRI request is for a Guest VM or a process within a guest VM (in one setting, the PASID information can be ignored; in the other setting, the PASID information is necessary for processing the request). The RZ bit indicates an error was in the received packet and the PPR information may be corrupt. The WP, RP, and NX bits represent the requested Write, Read, and Execute permissions, if any, in the PRI packet. The PPRtag field is to be returned to the peripheral in the PRI response packet. The S and Address fields define the address of the page needing service (along with PASID if GN indicates it is required). The Count field indicates how many contiguous pages are to be serviced in the request. A User/Supervisor (US) bit may be included to signal if the request is for a User or Supervisor access. While the information shown in FIG. 4 is for a PRI request, page service requests may take on other formats. However, information such as device ID and the address associated with the page request will generally be found in a page service request.

When a PRI request arrives, the information in the PRI request is written to memory 103 using the queue structure 203 illustrated in FIG. 2. Then system software executing on processor 101 is notified using an interrupt or other appropriate notification technique. System software is then able to consume the PRI request when it is able.

Some way must be provided for the system software to signal completion of the PRI request to the peripheral. That can be accomplished in several ways. In one embodiment, an IOMMU command is provided that takes key parts of the PRI request (FIG. 4) such as the tag field, count and DeviceID and directs the IOMMU to construct the PRI response packet according to protocol requirements. In an embodiment, a command queue for the IOMMU exists in system memory. System software writes the command to the IOMMU command queue and notifies the IOMMU that a new command has been placed on the stack. In an embodiment, software writes a PRI resume command into the command queue in memory. In order to notify the IOMMU, software writes a memory management I/O (MMIO) mail box (published by the IOMMU) to wake up the IOMMU and let it know there is new work in its command queue.

Finally, further parallelism is possible because there can be multiple IOMMUs in a system, each of which can service a different set of peripherals, all operating independently. For multiple MMUs, there are multiple PPR queues, one PPR queue per IOMMU. The interrupts from each of the MMUs may indirectly indicate origin. In an embodiment, the interrupt is configured to interrupt the CPU using an eight bit vector number. Each vector number has a unique code entry point. If software configures all IOMMU interrupts to use unique vector numbers, then the IOMMU source can be determined from the vector number. However, it is possible for the IOMMU interrupts to share vector numbers. If software does this, then it cannot tell immediately which IOMMU is interrupting and must check the PPR queue of each IOMMU mapped to the interrupt vector.

Figure 5:
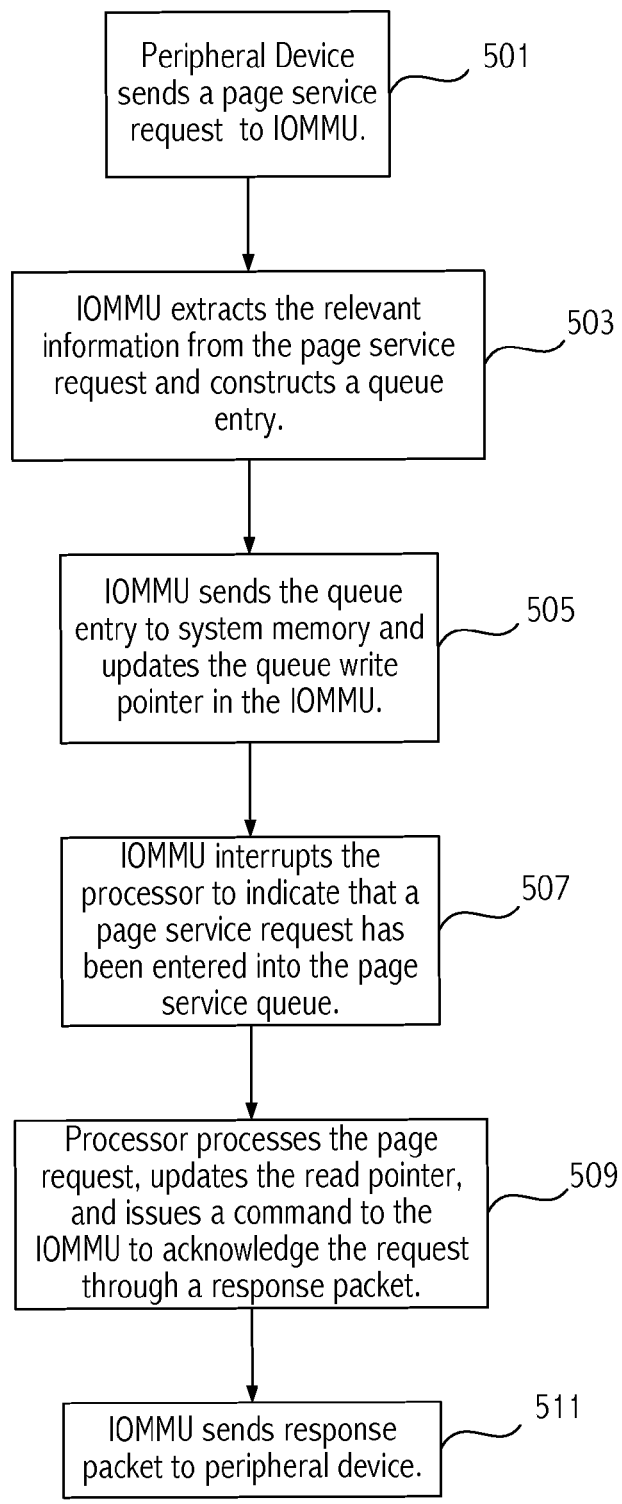
FIG. 5 illustrates an exemplary flow diagram of an embodiment of the invention.

FIG. 5 illustrates an exemplary flow diagram according to an embodiment of the invention. In 501, the peripheral device 111 sends a page service request over communication link 115 to IOMMU 110. In 503, IOMMU extracts the relevant information from the page service request and constructs a queue entry. In 505, the IOMMU sends the queue entry to system memory through the memory controller 102 and updates the queue write pointer in the IOMMU. In 507, the IOMMU interrupts the processor to indicate that a page service request has been entered into the page request queue in system memory. In response to the interrupt, in 509 the processor processes the interrupt and the page request, updates the read pointer in the IOMMU, and issues a command to the IOMMU to acknowledge the request through a response packet. Finally, in 511 the IOMMU sends a response packet to the peripheral device.

The approach of using the queue structure described herein has several advantages. It is scalable, thus able to handle a small system with minimal impact, but able to scale to large systems with lots of active I/O. Software development is kept simple (when compared to developing new software for new hardware). The invention can handle multiple PRI requests concurrently by a simple contention technique internal to the IOMMU based on access to the tail pointer register, so contention resolution can be fast. The approach described herein avoids changes to the processor and communication link architectures by using existing architectural mechanisms such as interrupts and system memory. Hardware modifications may be limited to the IOMMU. Finally, this queue approach cleanly separates mechanism implemented by various communication and processor protocols from policy (implemented by system software). Thus, the approach can be used on multiple processor architectures dealing with multiple communication protocols.

Aspects of embodiments of the invention may be implemented in software firmware, hardware, or combinations thereof. Computer readable media may store instructions that can be used to implement aspects of the invention. The computer readable media is tangible computer readable storage media permanently, removably, or remotely coupled to the computer system. The tangible computer readable storage media may include, for example, tangible media such as semiconductor-based memory such as RAM, EEPROM, or ROM, magnetic storage media, or optical storage media or other tangible storage media.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable media having encodings thereon (e.g., HDL, Verilog, GDSII data) of such circuits, systems, and methods, all as described herein, and as defined in the appended claims. In addition the computer readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the embodiments described herein utilize the IOMMU to generate queue entries and send response packets and interrupt the processor, other embodiments may locate that functionality elsewhere in the computer system based on the needs and requirements of each particular system. Other variations and modifications of the embodiments disclosed herein may be made based on the description set forth herein, without departing from the scope and spirit of the invention as set forth in the following claims.

What is claimed is:

1. A method comprising:
    receiving a page request from a peripheral device requesting that a memory page be loaded into system memory;
    writing page request information corresponding to the page request into a queue as a queue entry; and
    notifying a processor that the page request is available in the queue.

2. The method as recited in claim 1 further comprising notifying the processor with an interrupt to indicate to the processor that the page request has been received, the interrupt uniquely identified with existence of a new page request.

3. The method as recited in claim 1 further comprising signaling completion of the page request to the peripheral device after the processor has processed the page request.

4. The method as recited in claim 3 wherein the page request is received from the peripheral device at an input/output memory management unit (IOMMU).

5. The method as recited in claim 3 further comprising the processor providing an indication to the IOMMU to generate a message to signal the completion of the page request.

6. The method as recited in claim 1 wherein the queue is a circular buffer including a read and write pointer.

7. The method as recited in claim 6 further comprising host software executing on the processor indicating consumption of the queue entry by updating the read pointer.

8. The method as recited in claim 1 further comprising selecting a size of the queue by writing a programmable location.

9. A computer system comprising:
    an integrated circuit including,
        a first communication link interface to receive a page request from a peripheral device indicating a need for a memory page to be loaded into system memory; and
        queue entry generation logic responsive to receipt of the page request to generate a queue entry incorporating information from the page request and responsive to send the queue entry over a second communication interface for writing the queue entry into a page request queue.

10. The computer system as recited in claim 9 further comprising system memory coupled to the integrated circuit, the system memory including the page request queue.

11. The computer system as recited in claim 9 wherein the integrated circuit is further configured to notify a processor that the queue entry is available in the page request queue.

12. The computer system as recited in claim 10 wherein the integrated circuit further includes a tail pointer defining writes into the page request queue and a head pointer defining reads from the page request queue.

13. The computer system as recited in claim 12 wherein the head pointer is updated by software executed on the processor after reading the queue entry in system memory.

14. The computer system as recited in claim 12 wherein the tail pointer is updated by the integrated circuit after writing to the page request queue.

15. The computer system as recited in claim 10 wherein the queue entry comprises a device identification field identifying the peripheral device requiring memory page services and an address field containing a virtual address that the peripheral device wants to access.

16. The computer system as recited in claim 10 wherein the integrated circuit further includes a programmable queue length register to define a size of the page request queue and a queue base address register to define a base address of the page request queue.

17. The computer system as recited in claim 10 wherein the integrated circuit includes an input/output memory management unit (IOMMU).

18. The computer system as recited in claim 17 further comprising a second IOMMU configured to respond to page service requests from another peripheral device and the system memory includes a second page request queue to store page requests provided by the second IOMMU.

19. A non-transitory tangible computer-readable medium encoding a representation of an integrated circuit, the integrated circuit comprising:
    a first communication link interface to receive a page request from a peripheral device indicating a need for a memory page to be loaded into system memory;
    a second communications link interface; and
    queue entry generation logic responsive to receipt of the page request to generate a queue entry incorporating information from the page request and responsive to send the queue entry over the second communication link interface.

20. The non-transitory tangible computer readable medium as recited in claim 19 wherein the representation further includes a tail pointer defining writes into the page request queue and a head pointer defining reads into the page request queue.

21. The non-transitory tangible computer readable medium as recited in claim 19 wherein the queue entry comprises a device identification field identifying the peripheral device requiring memory page services and an address field containing a virtual address that the peripheral device wants to access.

\* \* \* \* \*